June 26, 1934.  F. KINZBACH  1,964,262
BRAKE FOR CAT HEADS
Filed July 16, 1931  2 Sheets-Sheet 1

Inventor
Frank Kinzbach
By
Hardway & Cathey
Attorneys

Patented June 26, 1934

1,964,262

UNITED STATES PATENT OFFICE 1,964,262

BRAKE FOR CAT HEADS

Frank Kinzbach, Houston, Tex.

Application July 16, 1931, Serial No. 551,147

8 Claims. (Cl. 188—72)

This invention relates to a cat head.

An object of the invention is to provide a cat head particularly designed for use on a well rig for handling heavy loads.

Another object is to provide, in a device of the character described, a novel and very efficient type of brake.

A further feature of the invention resides in the provision of novel means for setting and releasing the brake.

A still further feature is to provide novel means for adjusting the brake.

With the above and other objects in view this invention has particular relation to certain novel features of construction, operation and arrangement of parts an example of which is given in this specification and illustrated in the accompanying drawings wherein.

Figures 1, 2:
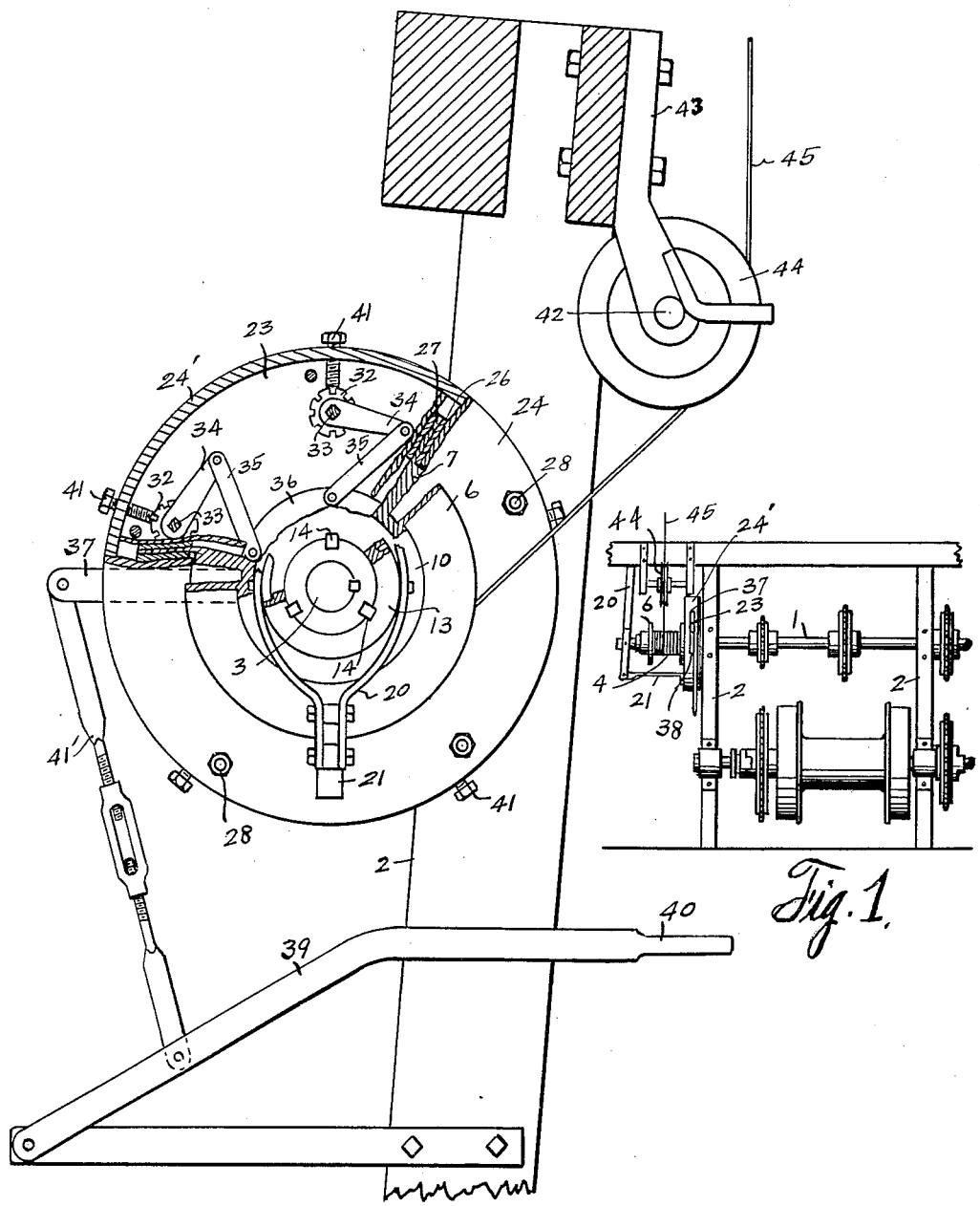
Figure 1 shows a front elevation of a draw works with the cat head mounted thereon.
Figure 2 shows a fragmentary vertical sectional view thereof.
Figure 3:
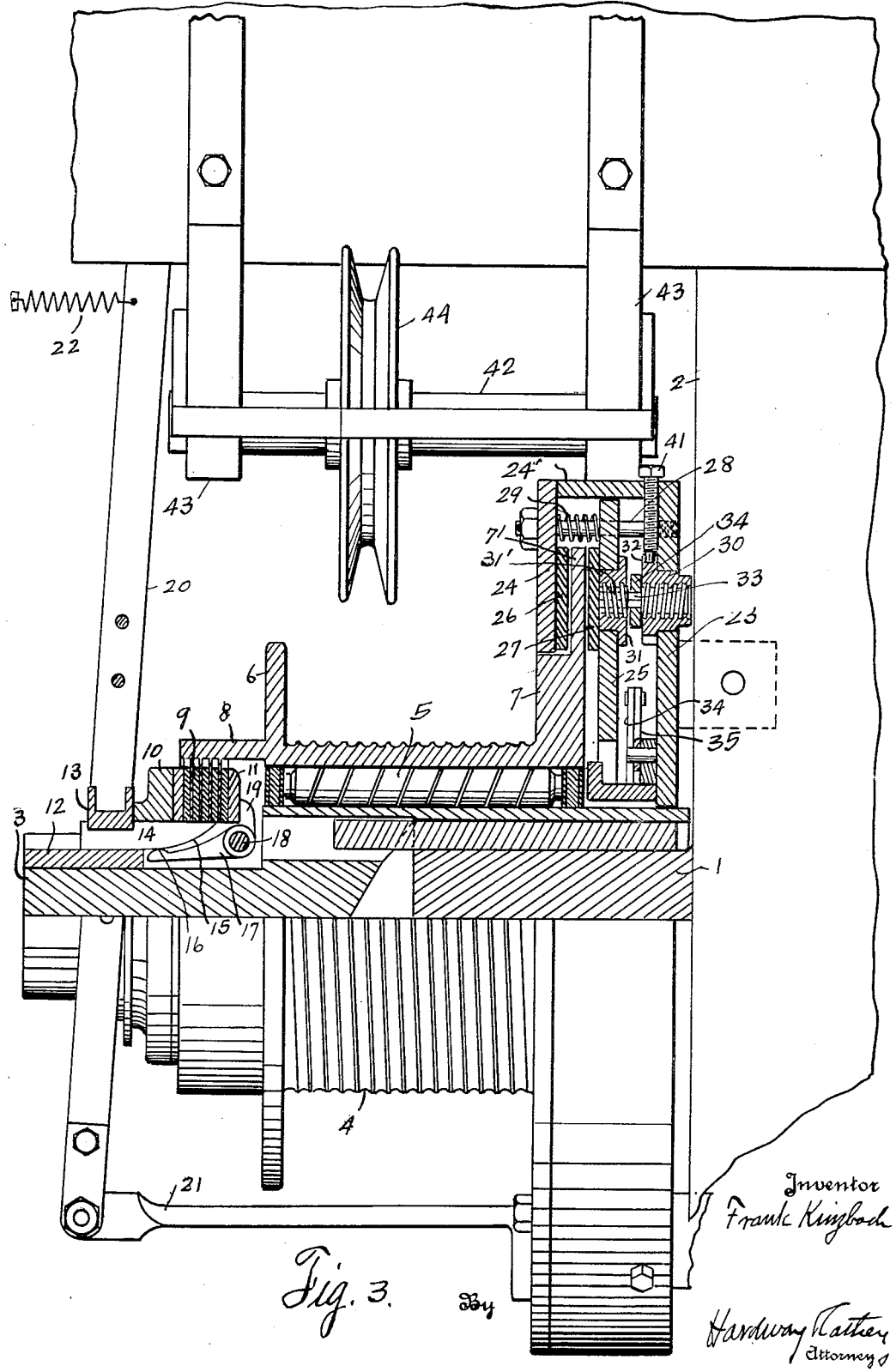
Figure 3 shows an elevational view of the cat head, partly in section.

In the drawings the numeral 1 designates the counter shaft of the draw works which is mounted in suitable bearings in the side members 2, 2 of the framework of the draw works. Splined on one end of this shaft 1 there is an extension shaft 3 on which the cat head is mounted. On this extension shaft 3 there is a cable winding drum 4 which is mounted to ride on the roller bearings 5. The drum has the outer and inner cable retaining flanges 6, 7 and extending outwardly beyond the flange 6 there is a clutch housing 8 wherein is located the conventional disc clutch 9 located between the outer clutch collar 10, fastened on the shaft 3, and the inner clamp ring 11, slidable on said shaft.

Around the outer end of the shaft 3 there is a guide sleeve 12 slidable on which there is a yoke 13 to which is attached the inwardly extending clutch actuating plungers 14 whose inner ends have the outwardly beveled bearing faces 15 which ride against the outside bearing faces 16 at the outer ends of the arms 17. These arms are mounted on the transverse shafts, as 18, in the guide sleeve 12, and these shafts 18 have the outwardly extended arms, as 19 fixed thereto which bear against the inner clamp ring 11.

There is a shift lever 20, one end of which is pivoted to the bracket 21. This lever is connected to the yoke 13 and a pull spring 22, connected to the free end of said lever normally serves to hold the yoke 13 outwardly and the plungers 14 retracted. The lever 20 may be manually actuated, by any suitable device, provided for the purpose, and the plungers forced inwardly thus moving the free ends of the arms 17 inwardly and clamping the arms 19 against the clamp ring 11 and thus clutching the drum 4 with the shaft 3.

At the other end of the drum 4 is the brake which will now be described. The brake housing comprises an inner annular plate 23 secured to the adjacent side member 2 and through which the shaft 1 extends; an outer annular plate 24 and the surrounding housing wall 24', preferably formed integrally with said inner plate and whose free margin abuts the outer plate.

The outer margin 7' of the retainer flange 7 is inwardly offset forming a brake rim and is overlapped by and spaced from the outer end plate 24.

There is an annular friction plate 25 in the housing and there are the annular brake linings 26, 27 secured to the facing sides of the plates 24, 25 and arranged to frictionally engage the offset margin 7' of the flange 7 from opposite sides. The friction plate 25 is mounted to slide on the guide rods 28 which anchor the outer and inner housing plates together and around said rods and interposed between the plates 24, 25 are the coil springs 29 which normally operate to hold the brake released.

Fitted through the plate 23, are the internally threaded nuts 30 which have the castellated heads 32 and fitted through the plate 25 are the glands 31 which are secured, against turning in said plate 25. There are a plurality of pairs of these nuts, and glands as shown, and the glands of each pair have the coarsely threaded nuts 31' threaded therein, said nuts 30, 31' having oppositely pitched threads. There are the actuating shafts 33 one end of each of which is threaded into the corresponding nut 30 of each pair and whose other ends are polygonal and fitted through correspondingly shaped bearings in the nuts 31' and fixed on these shafts 33 are the correspondingly extended arms 34 to the free ends of which the outer ends of the links 35 are pivoted. These links are correspondingly arranged and their inner ends are pivoted to the brake ring 36. A brake arm 37 is attached to this ring and works through the slot 38 in the brake housing. There is a brake actuating lever 39, pivoted at one end and whose other end is formed into a pedal 40 and the free end of the arm 37 is connected to the lever 39 by an adjustable link 41'. When the lever 39 is depressed, the brake arm 37 will be actuated and the ring 36 turned and this will operate through the links 35 and arms 34 to rotate the shafts 33 to force the friction plate 25 and the lining 27, carried thereby, against the opposing rim of the drum flange 7 and said rim will be forced into frictional contact with the brake lining 26 carried by the outer end plate 24, said drum having sufficient endwise movement to permit this, and said rim will be clamped between said brake linings and the drum thereby held against rotation. When the brake lever 39 is raised the rotation of the shafts 33 will be reversed to release the brakes and the springs 29 will operate to separate the brake plates 24, 25.

Threaded through the outer wall 24, of the housing are the lock bolts 41 whose inner ends engage the castellated nuts 30. When the bolts 41 are screwed outwardly and released from the nuts 30, said nuts may be adjusted, relative to the shafts 33 and the range of movement of the friction plate 25 thus varied and the brake thus adjusted.

On the draw works framework there is a guide rod 42, supported on the brackets 43, 43 and on this rod there is a slidably mounted guide pulley 44. The cable 45, which is operated from the drum 4 works over this pulley and is thereby held out of contact with said framework and is protected from injury by frictional contact therewith.

The drawings and description disclose what is now considered to be a preferred form of the invention by way of illustration only, while the broad principle of the invention will be defined by the appended claims.

What I claim is:

1. In combination, a drum having a brake rim, a brake housing wherein said rim is located, a friction plate, shafts having reversely threaded connections with said friction plate and housing, brake surfaces on opposite sides of said rim one on the housing and the other on said plate and arranged to clamp the rim between them and means for rotating said shafts whereby the friction plate is caused to move relative to the housing to clamp said rim between said surfaces.

2. In combination, a drum having an external annular flange thereon forming a brake rim, a housing, an annular plate in the housing, brake surfaces on opposite sides of said rim, one on the housing and the other on said plate, jack shafts in the housing connected with said housing and plate whereby the rotation of the shafts will cause an axial movement of said plate relative to the drum to effect the clamping of said rim between said surfaces.

3. In combination a drum having a flange forming a brake rim, a brake housing, an end plate on the housing on one side of the rim, a brake surface support in the housing having a brake surface thereon on the other side of said rim, means normally holding said brake surface out of contact with said rim and means for actuating the support to effect the setting of said brake surface against said rim, and to clamp the rim between said plate and brake surface, said actuating means including jack shafts having threaded connections with the support and housing and means for rotating said shafts.

4. In combination a drum having a flange forming a brake rim, a brake housing, a brake surface support in the housing having a brake surface thereon, means normally holding said brake surface out of contact with said rim and means for actuating the support to effect the setting of said brake surface against said rim, said actuating means comprising jack shafts operatively connected with said support, arms on said shafts, an actuating ring, links connecting said arms and ring and means for rotating the ring.

5. In combination a drum having a flange forming a brake rim, a brake housing, a brake surface support in the housing having a brake surface thereon, means normally holding said brake surface out of contact with said rim and means for actuating the support to effect the setting of said brake surface against said rim, said actuating means including shafts having threaded mountings in the housing and operatively connected with said support, means for rotating the shafts to move the support axially of the drum, and adjusting means for determining the range of such movement.

6. The combination with a rotatable member having a brake rim, annular brake members on opposite sides of said rim one of which is movable relative to the other, jack shafts mounted for rotation and disposed in substantially right angular relation with respect to said brake rim and having threaded connections whereby the rotation of said shafts will operate to relatively move said brake members toward and from said rim and adjustable means for determining the range of such movement.

7. In combination a drum having an outwardly extended brake flange, a brake housing in which said flange is located, brake plates on opposite sides of the flange, one of said brake plates being axially movable relative to the drum, brake shafts each shaft having a threaded connection with the housing and with said movable brake plate whereby, upon rotation of said shafts, said movable brake plate may be forced into and released from braking relation with said flange and means for manually and simultaneously rotating said shafts in either direction, said means comprising arms on the shafts, an actuating ring, links connecting said arms and ring and means for actuating the ring.

8. In combination a drum having a brake rim, a brake housing, a brake surface support in the housing having a brake surface thereon, means normally holding said brake surface out of contact with said rim, means for actuating the support to effect the setting of said brake surface against said rim, said actuating means comprising shafts operatively connected with said support, arms on said shafts, a rotatable ring, operative connections between said ring and arms through which said arms may be operated to rotate the shafts upon rotation of the ring and means for rotating said ring.

FRANK KINZBACH.